United States Patent
Robson

(10) Patent No.: US 8,225,464 B2
(45) Date of Patent: Jul. 24, 2012

(54) FASTENER ARRANGEMENTS

(75) Inventor: Peter Maxwell Robson, Jersey (GB)

(73) Assignee: Touac International Limited, Cheshire (GB)

( * ) Notice: Subject to any disclaimer, the term of this patent is extended or adjusted under 35 U.S.C. 154(b) by 896 days.

(21) Appl. No.: 11/914,345

(22) PCT Filed: May 12, 2006

(86) PCT No.: PCT/GB2006/001741
§ 371 (c)(1),
(2), (4) Date: Sep. 10, 2008

(87) PCT Pub. No.: WO2006/120459
PCT Pub. Date: Nov. 16, 2006

(65) Prior Publication Data
US 2009/0211064 A1    Aug. 27, 2009

(30) Foreign Application Priority Data

May 12, 2005   (GB) .................................. 0509679.7
Oct. 6, 2005    (GB) .................................. 0520333.6

(51) Int. Cl.
*F16B 5/06* (2006.01)
(52) U.S. Cl. ........................................... 24/297; 24/453
(58) Field of Classification Search .................. 24/297, 24/453, 295, 293; 411/408–410
See application file for complete search history.

(56) References Cited

U.S. PATENT DOCUMENTS 2,451,591 A    10/1948 Tinnerman et al.
2,499,637 A     3/1950 Flora
4,782,562 A *  11/1988 Yuta ................................. 24/297

OTHER PUBLICATIONS

International Search Report for PCT/GB2006/001741 dated Oct. 4, 2006.

* cited by examiner

*Primary Examiner* — James Brittain
(74) *Attorney, Agent, or Firm* — Lowe Hauptman Ham & Berner, LLP

(57) ABSTRACT

A fastener arrangement comprises: a) a fastener receiver (12) having a lip (13); b) a fastener element (14) having a body part (15) and a resiliently connected latch member (16) having a hook (17) adapted to engage the lip; c) the body part comprising a fulcrum (18) adapted to bear against the receiver at a position spaced from the lip when the hook engages the lip, with relative flexure of the body part and the latch member giving rise to a force holding the hook under the lip and the fulcrum against the receiver; d) the body part having a press-to-engage, press-to-release actuator member (19) connected to the body part on the side of the fulcrum remote from the latch member; f) the hook having a camming face which, when the engaged fastener element is tipped about the fulcrum by pressure on the actuator member, cooperates with the lip to flex the latch member away from the lip to release the latch member so that the fastener element can be withdrawn from the receiver. A no-release version is also disclosed.

24 Claims, 6 Drawing Sheets

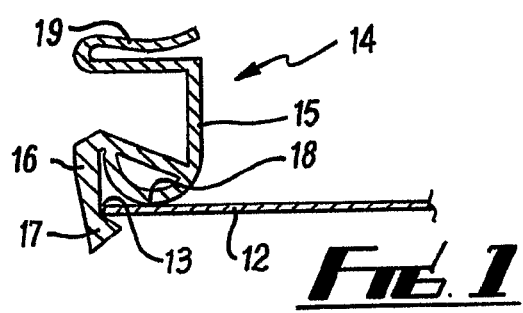
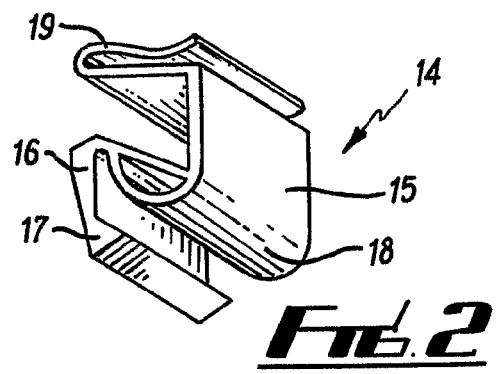
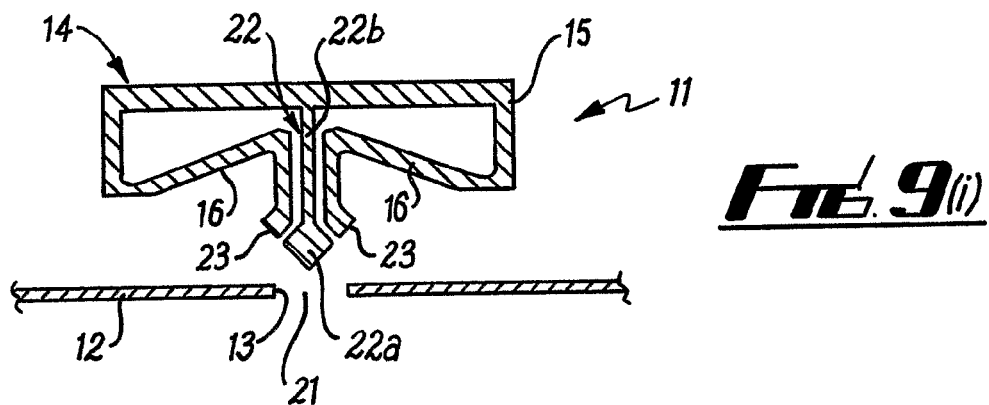
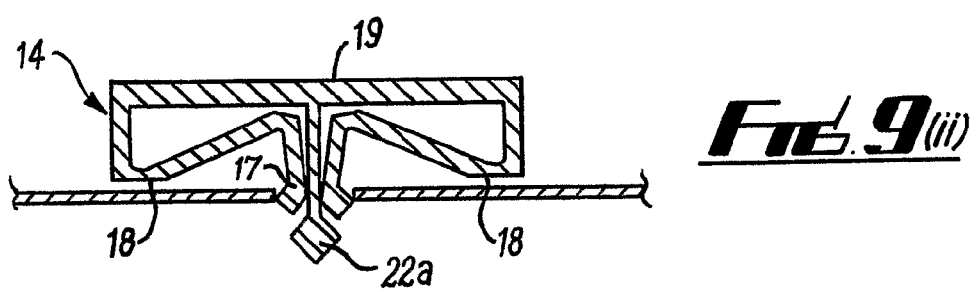
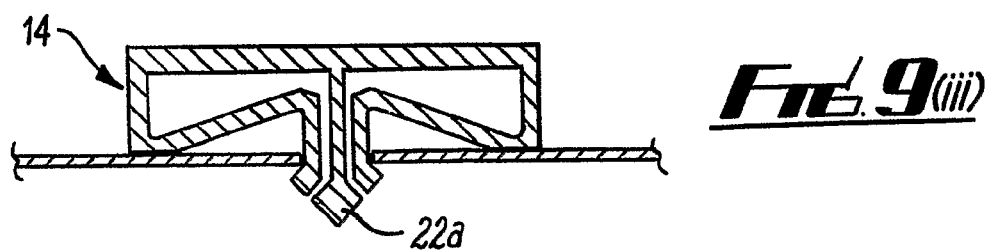

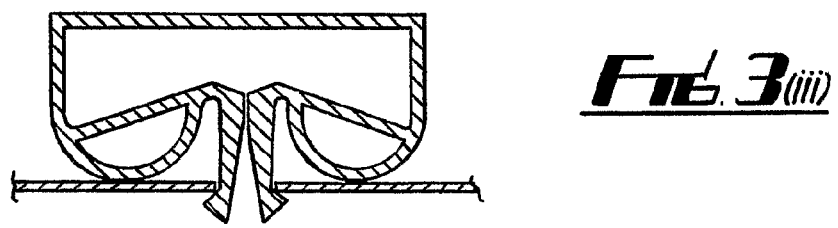
FIG. 3(iii)

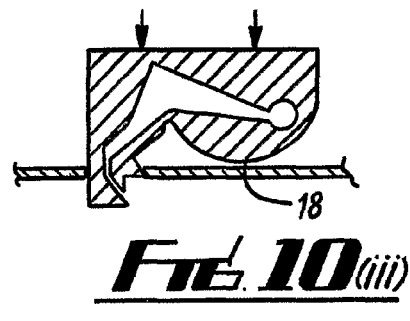
FIG. 10(iii)

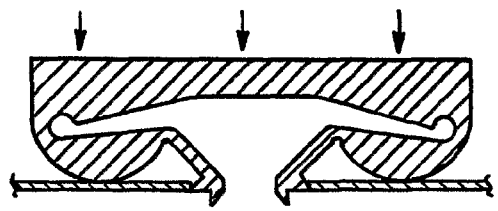
FIG. 12(iii)
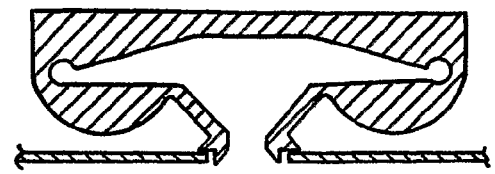
FIG. 12(vii)

FASTENER ARRANGEMENTS

RELATED APPLICATIONS

The present application is based on International Application No. PCT/GB2006/001741 filed May 12, 2006, and claims priority from UK Patent Application Number 0509679.7 filed May 12, 2005, and UK Patent Application Number 0520333.6 filed Oct. 6, 2005, the disclosures of which are hereby incorporated by reference herein in their entirety.

FIELD OF THE INVENTION

This invention relates to fastener arrangements.

BACKGROUND OF THE INVENTION

There are many different types of fasteners, some particularly adapted to a specific fastening function, others of more general application. Thus, buttons, which cooperate with buttonholes, are particularly adapted for textile use, since the buttonhole must be flexible, as are pop studs, in which one member with a head is inserted into a member with a recess over a spring which retains the head in the recess until force is applied to pull the two members apart.

Screws, which engage in threaded apertures or which are self tapping, are another form of fastener used for securing more rigid objects together or for fixing objects to walls, often into plugs of fibre or plastic inserted into drilled holes, causing the plugs to expand into close contact with the hole wall to be retained there by friction. Screws are removed by the application of torsion of opposite hand to that which inserted them. Spring clips are pushed in, resiliently narrowing to pass a detent, and expanding to retain them. They are removed by pulling them out against the resilience of the spring. Rivets are like spring clips except that they are permanently deformed once past a detent, and cannot generally be removed without destruction.

SUMMARY OF THE INVENTION

The present invention provides fastener arrangements that are adaptable to a wide variety of fastening situations, with substantially increased ease of fastening and unfastening, as compared to conventional fastener arrangements.

The invention comprises a fastener arrangement comprising:
a) a fastener receiver having a lip;
b) a fastener element having a body part and a resiliently connected latch member having a hook adapted to engage the lip;
c) the body part comprising a fulcrum adapted to bear against the receiver at a position spaced from the lip when the hook engages the lip, with relative flexure of the body part and the latch member giving rise to a force holding the hook under the lip and the fulcrum against the receiver;
d) the body part having a press-to-engage, press-to-release actuator member connected to the body part on the side of the fulcrum remote from the latch member;
e) the hook having a camming face which, when the engaged fastener element is tipped about the fulcrum by pressure on the actuator member, cooperates with the lip to flex the latch member away from the lip to release the latch member so that the fastener element can be withdrawn from the receiver.

The fastener receiver may comprise a panel, for example, a panel of a structural element which is to be fastened to something, or to which something is to be fastened by the fastening arrangement. The lip may be on an edge of the panel. It may then be arranged that the frictional coefficient between the fulcrum and the receiver—the panel—is such as to hold the fulcrum in place on the receiver under the force to which the relative flexure of the body and latch member gives rise.

The lip may be on an edge of an aperture in the panel. In this case, it may not be necessary to arrange for a particular frictional coefficient, rather the fastener element may comprise opposed latch members engaging opposite sides of the aperture. The aperture may be circular, and the fastener element being able to be set therein at any desired orientation. However, the aperture may be non-circular, and the fastener element can then be set therein only at one predetermined orientation, or one of a number of predetermined orientations. The aperture may, for example, be rectangular, and may be a slot, which may be only of such a size that the fastener element occupies the whole of it, but which may, on the other hand, be longer than the fastener element facilitating adjustment of the fastener element along the slot. The slot may be long enough to accommodate two or more spaced apart fastener elements The fastener element may comprise a wedge member intermediate the opposed latch members which locks the latch members against flexure, the one towards the other, but which is displaced by the actuator member to permit relative flexure. The wedge member may comprise a wedge part joined to the actuator member by a connecting member. Such a wedge member can urge the latch members into engagement with the lip when a pulling force is exerted on the body part to try to remove it. This means that the fastener can be load bearing quite independently of the latch members, which may be quite flimsy, for ease of insertion and removal—removal, that is to say, by the 'proper' method of applying release pressure.

The body part of the fastener element may have a body wedge part that is, together with the latch member, accommodated in the aperture.

The latch member may cooperate with the lip to flex the latch member away from the lip by having a camming face on the hook. The latch member may have camming faces on the hook operative to flex the latch member away from the lip during both engagement and release.

The hook may have a camming face which acts, after the actuator member is pressed for release, to propel, through the resilience of the latch member, the fastener element away from the receiver.

The fulcrum may comprise an arcuate formation.

The fastener receiver may be a part of a structural member to which the fastener element is to be attached, and may comprise an edge of the structural member or an edge of an aperture in the structural member.

The fastener receiver may comprise an attachment for attaching to a structural member. The attachment may be adhesively attached to the fastener receiver, or stitched thereto, or welded.

The fastener element may be adapted for attachment to a structural element. A face of the body part may be adapted for adhesive attachment. The body part may comprise a hanger, which may comprise a ring, which may be adapted to slide on a curtain or like rail.

The fastener element may be moulded in plastics material, or may be extruded and cut to required length.

Fastener arrangements according to the invention will now be described with reference to the accompanying drawings, in which:—

BRIEF DESCRIPTION OF THE DRAWING

FIG. 1 is a perspective view of a first embodiment of a fastener element;

FIG. 2 is a side view of the element of FIG. 1 fastened to a fastener receiver;

FIG. 9 is a series of three side views 9(i) to 9(iii) showing configurations of another embodiment of fastener element during insertion into a fastener receiver;

DETAILED DESCRIPTION OF THE DRAWING

Figure 3I:
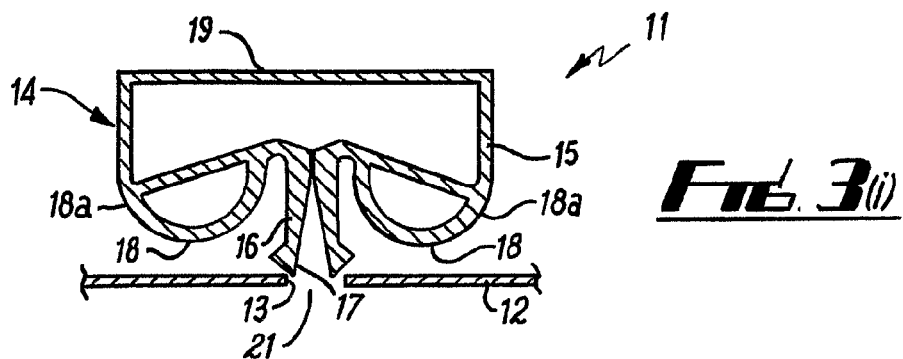
FIG. 3 is a side view, like FIG. 2, of a second embodiment of fastener element, in a series of five sections, 3(i) to 3(v), showing the actions of engagement and release.

The drawings illustrate fastener arrangements 11 comprising:
a) a fastener receiver 12 having a lip 13;
b) a fastener element 14 having a body part 15 and a resiliently connected latch member 16 having a hook 17 adapted to engage the lip 13;
c) the body part 15 comprising a fulcrum 18 adapted to bear against the receiver 12 at a position 19 spaced from the lip 13 when the hook 17 engages the lip 13, with relative flexure of the body part 15 and the latch member 16 giving rise to a force holding the hook 17 under the lip 13 and the fulcrum 18 against the receiver 12;
d) the body part 15 having a press-to-engage, press-to-release actuator member 19 connected to the body part 15 on the side 18a of the fulcrum 18 remote from the latch member 16;
e) the hook 17 having a camming face 17a which, when the engaged fastener element 14 is tipped about the fulcrum 18 by pressure on the actuator member 19, cooperates with the lip 13 to flex the latch member 16 away from the lip 13 to release the latch member 16 so that the fastener element 14 can be withdrawn from the receiver 12.

In the embodiments of FIGS. 1 to 7 and 9 to 11, the fastener receiver 12 comprises a panel, for example, a panel of a structural element which is to be fastened to something, or to which something is to be fastened by the fastening arrangement. A panel may be a rigid panel, such as a pane of glass, a metal or plastics sheet material member such as a component of an automobile or aircraft body, a wood, e.g. plywood, MDF or plasterboard panel such as may be used in domestic walling, or built-in kitchen and bathroom furniture, or a locally rigidifed or reinforced non-rigid panel such as a textile panel, say, of a duvet cover, or a shirt front, the fasteners there substituting for buttons and buttonholes or pop studs.

The lip 13 may be on an edge of the panel, as shown in FIGS. 1 and 2. If it is then arranged that the frictional coefficient between the fulcrum 18 and the receiver—the panel 12—is such as to hold the fulcrum 18 in place on the receiver 12 under the force to which the relative flexure of the body and latch member gives rise, the receiver 14 will clamp on to the receiver 12 just as does a spring clip of the type used, for example, to secure together a back panel and a glass front of a frameless picture frame. Whereas, however, such a spring clip has to be prised off, for dismantling, the fastener element 14 is released by pressing on the actuator 19. It will readily be seen from FIG. 2 that such pressure will rock the element 14 clockwise on the fulcrum 18, the camming surface 17a forcing the latch member 16 to be flexed outwardly until the camming surface 17a is clear of the edge 13 of the panel 12, so that the fastener element 14 is released.

Figure 4:
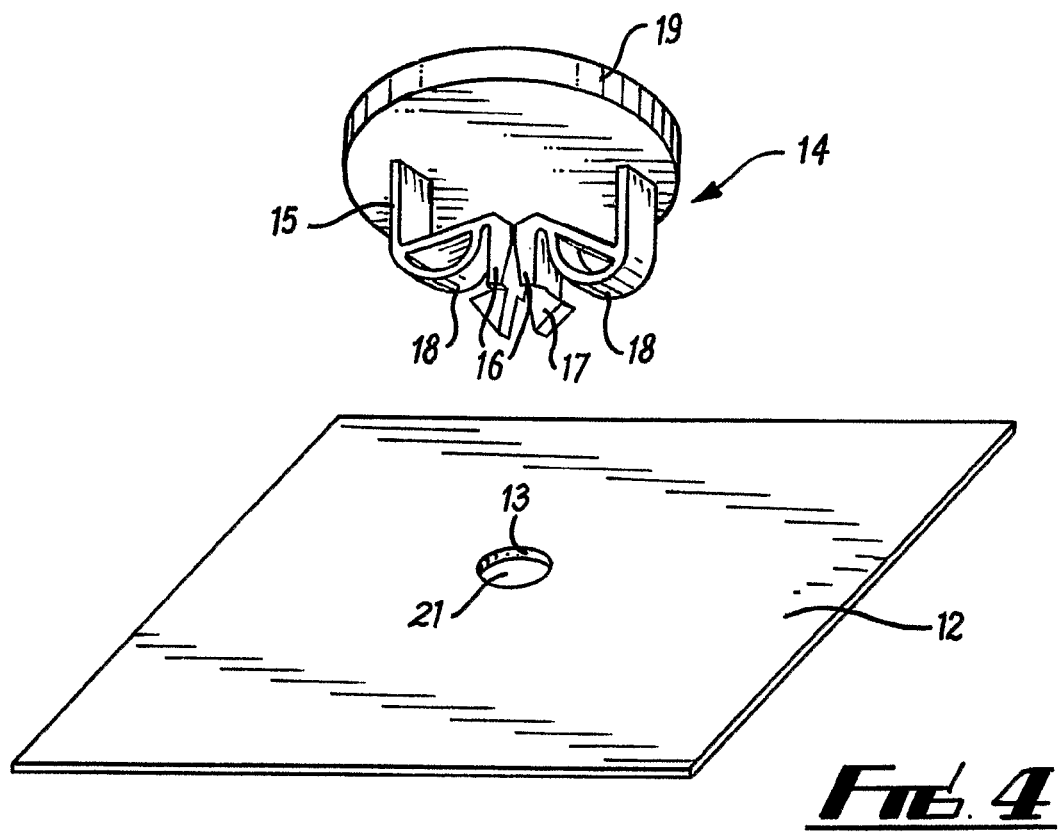
FIG. 4 is a perspective view of one embodiment of fastener arrangement like that shown in FIG. 3.
Figure 5:
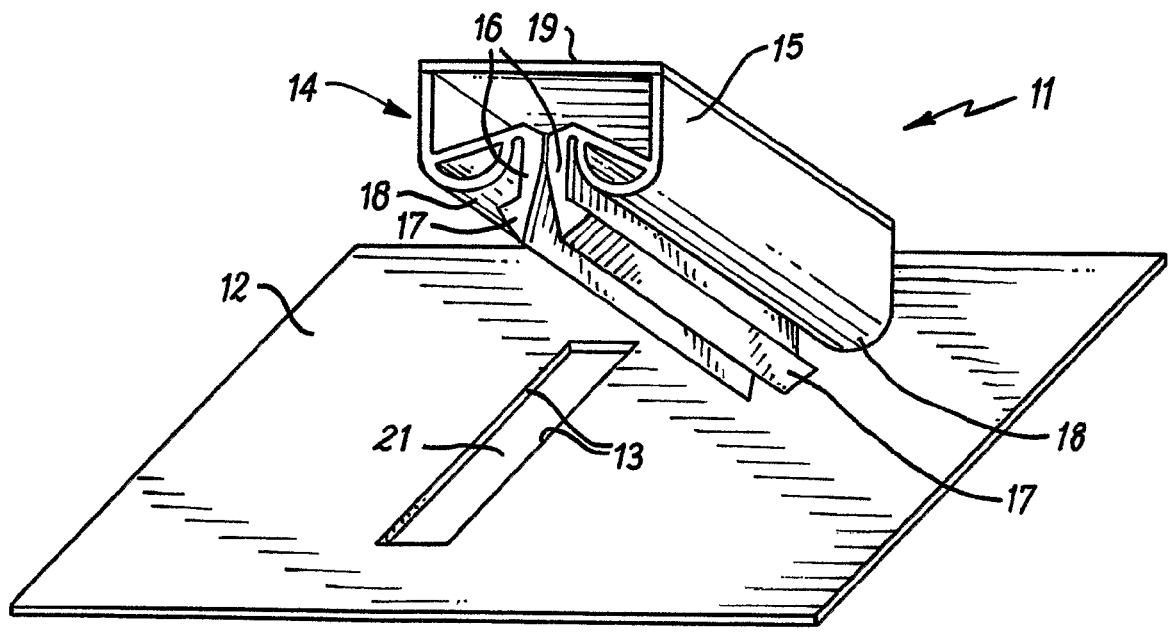
FIG. 5 is a perspective view of another embodiment of fastener arrangement like that shown in FIG. 3.

The fastener element 14 of FIGS. 1 and 2 relies, as mentioned, on friction to keep it located. The other fastener elements 14 illustrated in the drawings are positively located in apertures 21 in panels 12. The lip 13 is then on an edge of an aperture 21 in the panel 12. In this case, it is not necessary to arrange for a particular frictional coefficient, rather the fastener element 14, in the embodiments of FIGS. 3 to 9 comprise opposed latch members 16 engaging opposite sides 21a, 21b of the aperture 21. The aperture 21 may be circular, as shown in FIG. 4, the fastener element being able to be set therein at any desired orientation. However, the aperture 21 may be non-circular, as shown in FIG. 5, and the fastener element can then be set therein only at one or two predetermined orientations, or one of several predetermined orientations. The aperture 21 may, for example, be rectangular, and may be a slot, as shown particularly in FIG. 5, which may, as there illustrated, be only of such a size that the fastener element 14 occupies the whole of it, but which may, on the other hand, be longer than the fastener element 14, facilitating adjustment of the fastener element 14 along the slot 21. The slot 21 may be long enough to accommodate two or more spaced apart fastener elements 14. Friction may here play a part in determining whether or not the elements 14 are slidable or fixed in position when inserted into the slot 21.

Other non-circular aperture shapes include elliptical, triangular (allowing three orientations), square (allowing four orientations), pentagonal, and so forth.

The fastener element 12 shown in FIG. 9 comprises a wedge member 22 intermediate the opposed latch members 16 which locks the latch members 16 against flexure, the one towards the other, but which is displaced by the actuator member 19 to permit relative flexure. The wedge member 22 comprises a wedge part 22a joined to the actuator member 19 by a connecting member 22b. In other embodiments which do not have the wedge member 22, the latch members 16 abut when engaged.

The action of engagement, for the FIG. 9 version, is shown in FIGS. 9(i), (ii) and (iii). To engage, the fastener element 14 is presented to the aperture 21, as at FIG. 9(i). The aperture 21 is large enough to accommodate the wedge part 22a, but the latch members 16 have camming faces 23 on the hooks 17 that are forced inwardly by the edges of the aperture 21. The latch members 16 flex inwardly (FIG. 9(ii)) until the hooks 17 can pass through the aperture 21, when they spring outwardly to lock the fastener element 14 in the aperture 21 (FIG. 9(iii)). This embodiment is actually a permanent fastener, namely one which is designed not to be released. It could, however, be modified so as to be capable of being released by further downward pressure, if the fulcrums 18 on which the latch members 16 pivot were made so that the latch members were rotated upwardly on depression of the fastening.

Figure 3:
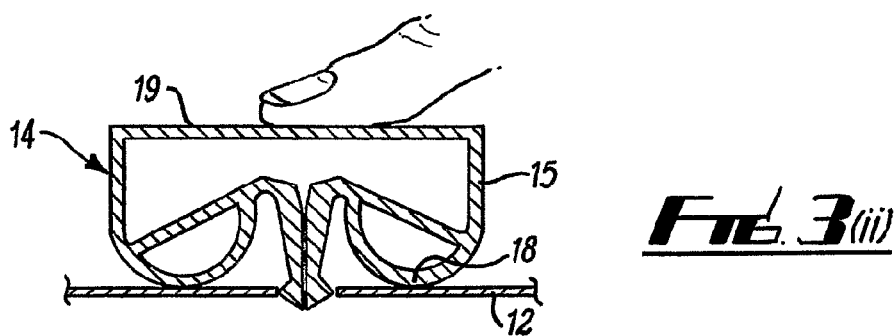
Figure 3:
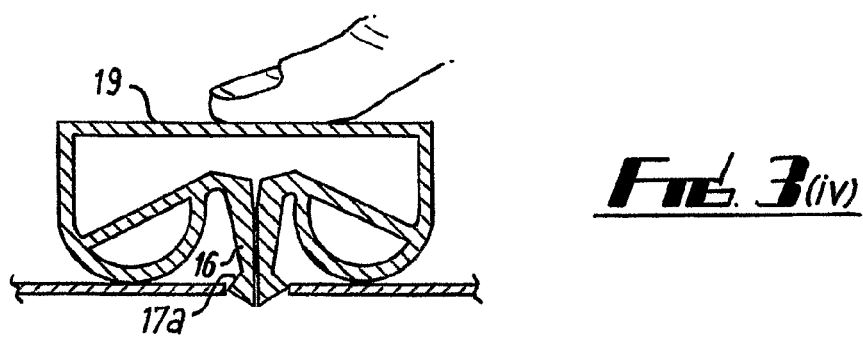
Figure 3V:
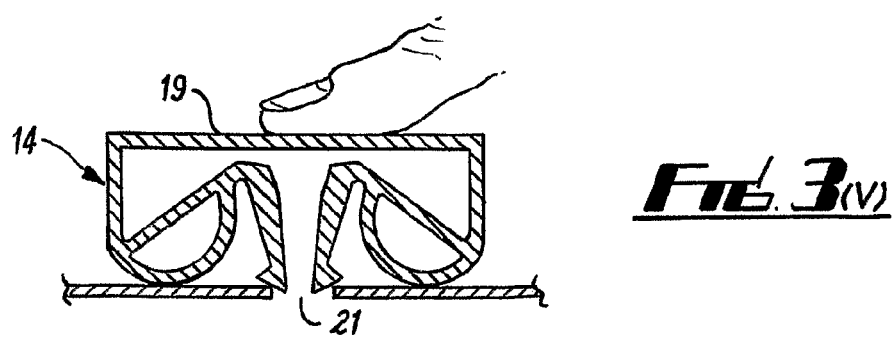

FIG. 3 illustrates a sequence of operation steps for a fastener without an intermediate wedge member. As the element 14 is presented to the aperture 21 (FIG. 3(1)), the canning faces 22 urge the latch members together until they can pass through the aperture (FIG. 3(ii)), whereupon they spring outwardly to lock the element in the aperture (FIG. 3(iii)). Disengagement is effected by pressure on the actuator member 19 (FIG. 3(*iii*)) which rocks the latch members 16 about the fulcrums 18 until the hooks 17 are again together and the camming faces 22 are against the edges of the aperture 21, which, again, pops the element 14 out of the aperture 21.

The fulcrum 18 is, in the embodiments of FIGS. 1 to 8 and 10 to 13, of arcuate shape, so that the action is a rolling action against the receiver 12. In FIG. 9, the fulcrum 18 is an edge of a flat area.

Figure 6:
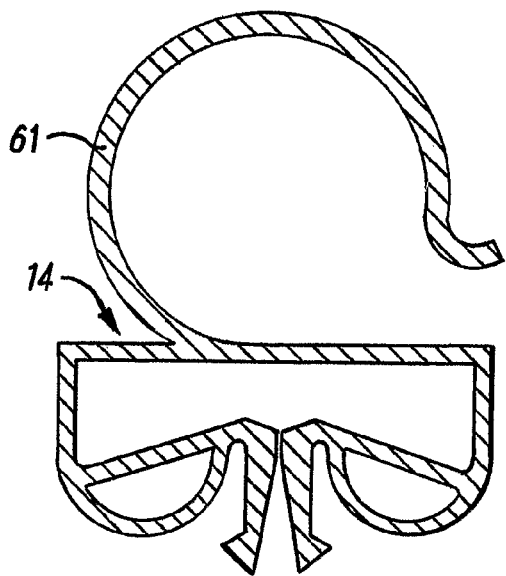
FIG. 6 is a side view of another embodiment of fastener element.
Figure 7:
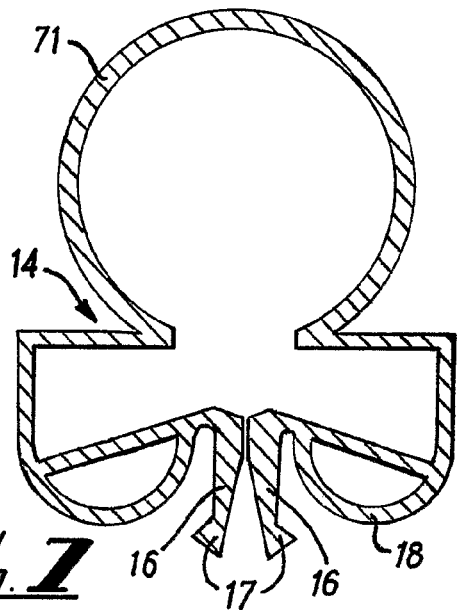
FIG. 7 is a side view of yet another embodiment of fastener element.
Figure 8:
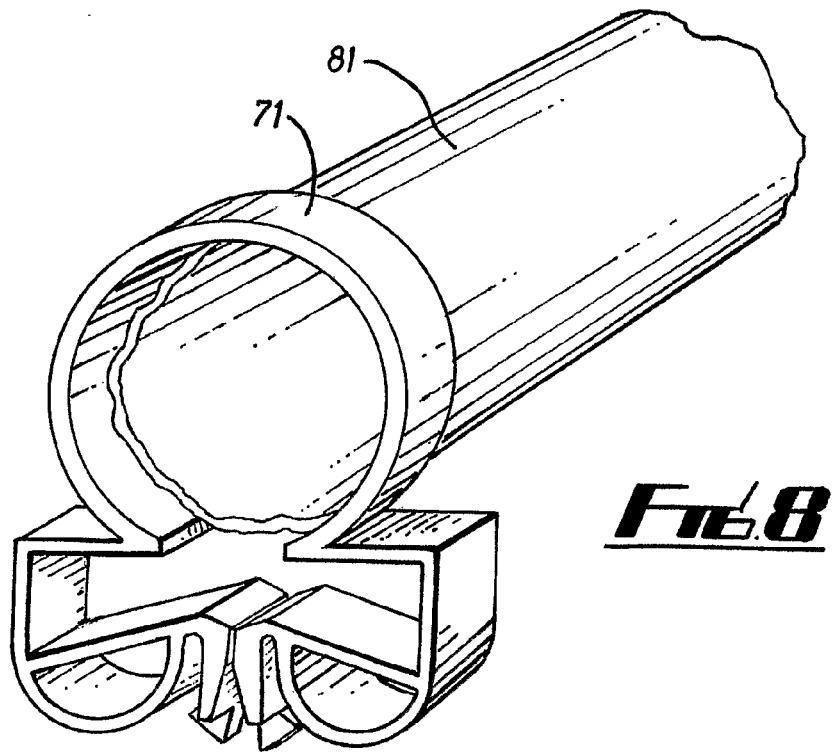
FIG. 8 is a perspective view of the element of FIG. 7, on a curtain or like rail.

FIGS. 6, 7 and 8 illustrate how the fastener element 14 may be adapted for attachment to a structural element. The body part 15 in FIG. 6 comprises a hanger 61, while that in FIG. 7 comprises a ring 71, which may be adapted to slide on a curtain or like rail 81, as shown in FIG. 8. The element 14 can then be fastened to a suitable receiver on a curtain. As the ring 71 is on the rail 81, actuation is effected by pressing the receiver towards the element.

The other embodiments may be adapted for adhesive attachment, as by having an adhesive coating protected by a release lining. The fastener elements 14 may be presented, for sale, attached to a strip or sheet of release liner from which they may be detached one by one as required.

The hanger 61 of FIG. 6 may be fashioned as a picture hook, the fastener element being intended to be fixed in a hole drilled in plasterboard or in a special receiver placed in a hole drilled in wall plaster. If otherwise not restrained against rotation, and especially if heavy loads are to be suspended, two such fastener elements could be connected together by a bar or strap, and might be fashioned so by moulding.

Other attachment configurations can be used as may be required to suit any particular purpose. The fastener element may, for example, be apertured for a sewn attachment, or may have attachments welded or adhered to it.

Figure 10I:
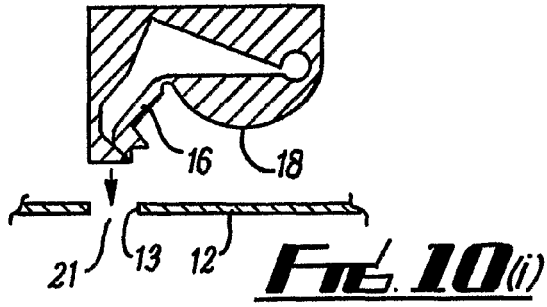
FIG. 10 is a series of six side views 10(i) to 10(vi) showing configurations of another fastener element during engagement with and release from a receiver.
Figure 10:
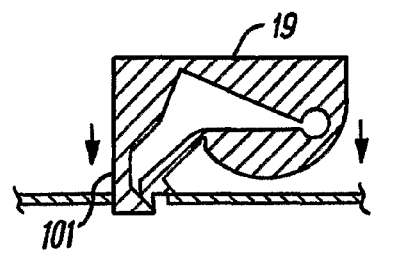
Figure 10:
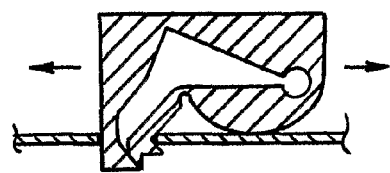
Figure 10V:
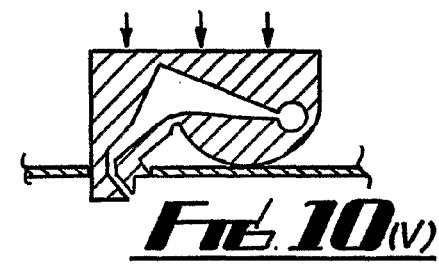
Figure 10:
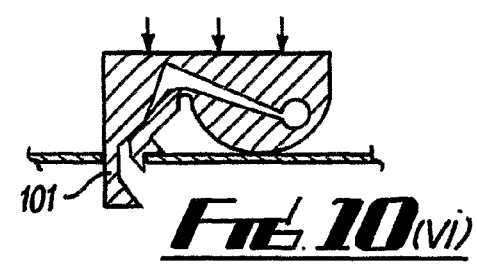
Figure 11:
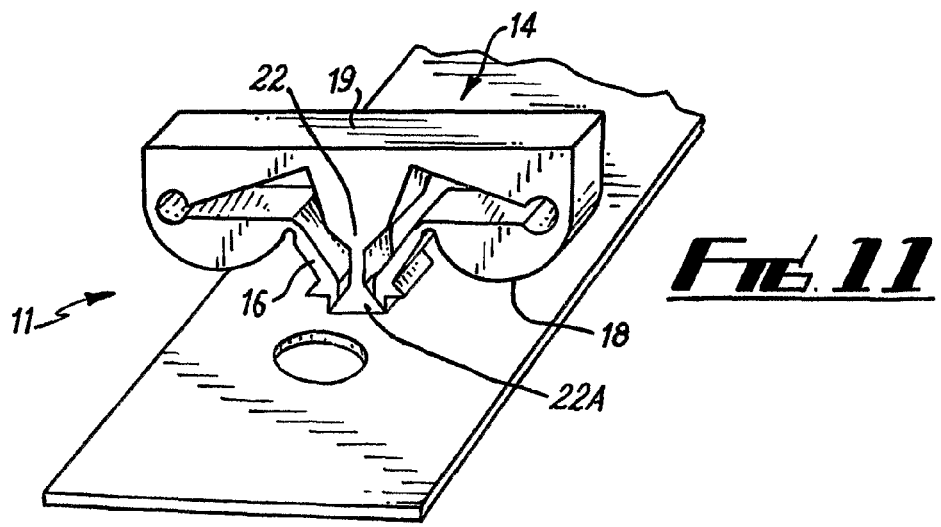
FIG. 11 is a perspective view of a double-sided version of the arrangement shown in FIG. 10.
Figure 12I:
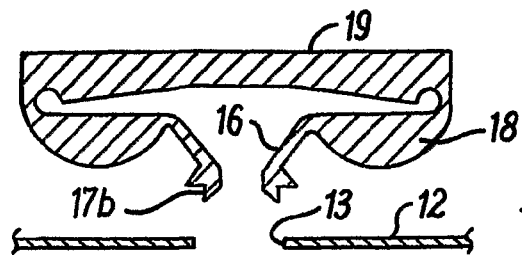
FIG. 12 is a series of seven views 12(i) to 12(vii) showing configurations of another fastener element during engagement with and release from a receiver.
Figure 12:
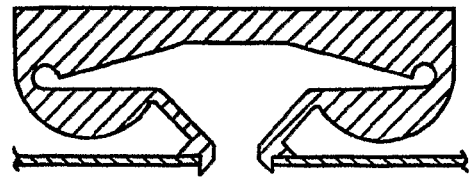
Figure 12:
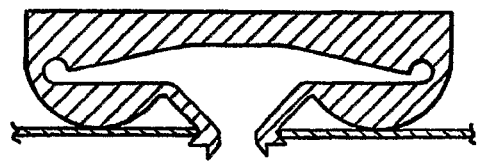
Figure 12V:
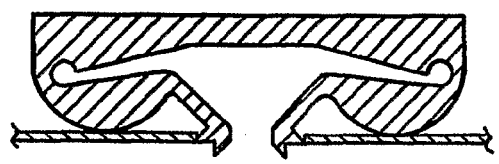
Figure 12:
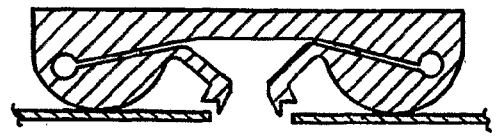

FIG. 10 illustrates a sequence of steps FIGS. 10(*i*) to (*vi*) to engage and disengage another embodiment of Fastener element 14, which is essentially like that of FIG. 9 in having a wedge member 101, but only one latch member 16. A double-sided version is shown in perspective view in FIG. 11. FIG. 12 is a series of views of a fastener like that of FIG. 11, but without the wedge member 22. In the embodiments of FIGS. 10, 11 and 12, the hook 17 has a birdmouth formation 17*b*, As best seen in FIG. 12, the birdmouth formation 17*b* engages the lip 13 as the fastener is introduced to the aperture 21 (FIGS. 12(*i*), (*ii*) and (*iii*)) to cam the hook 17 into the aperture 21. FIG. 12(*iv*) show the fastener fully engaged in the aperture 21. Although the hook 17 appears minimally to engage the lip 13, it is found surprisingly that the fastener is firmly secured in the aperture 21. Attempts to dislodge it by pulling on the body part 15 result in a tightening of the hook 17 against the lip 13. Pressure, however, on the actuator member 19 moves the hook 17 inwardly of the aperture 21 away from the rim 13, and the birdmouth formation 17*b*, when pressure is released, engages the rim 13 and pushes the body part away from the fastener receiver 12, as seen in FIGS. 12(*v*), (*vi*) and (*vii*).

It will be appreciated that the detailed design of the fastener arrangements 11 illustrated may very from those illustrated without departing from the general concept. Design may be influenced at least to some extent by the chosen method of manufacture, and also by the function the fastener is required to perform, which may dictate what can be attached to the fastener and how. Fastener elements may of course be moulded out of plastics material or metals, but embodiments such as shown in FIG. 11, for example, may be extruded and chopped to required length.

Press-to-engage, press-to release fasteners are, of course, known, but comprise several separate components which have to be assembled. The fasteners described above are essentially one piece mouldings or extrusions.

There are no induced stresses in the engaged configurations of the fastenings, so that operation engage/release cycles are virtually unlimited. The load carrying part of the fastening is independent of the engage/release structure. Engage/release operation is effected by relative flexure of the body part and the latch member, rather than flexure of the body part per se.

The invention claimed is:

1. A fastener arrangement comprising:
   a) a fastener receiver having a lip;
   b) a fastener element having a body part and a resiliently connected latch member having a hook adapted to engage the lip;
   c) the body part comprising a fulcrum adapted to bear against the receiver at a position spaced from the lip when the hook engages the lip, with relative flexure of the body part and the latch member giving rise to a force holding the hook under the lip and the fulcrum against the receiver;
   d) the body part having a press-to-engage, press-to-release actuator member connected to the body part on the side of the fulcrum remote from the latch member;
   e) the hook having a camming face which, when the engaged fastener element is tipped about the fulcrum by pressure on the actuator member, cooperates with the lip to flex the latch member away from the lip to release the latch member so that the fastener element can be withdrawn from the receiver.

2. A fastener arrangement according to claim 1, in which the fastener receiver comprises a panel.

3. A fastener element according to claim 2, in which the panel is of a structural element to be fastened to something or to which something is to be fastened by the fastening arrangement.

4. A fastener arrangement according to claim 2, in which the lip is an edge of the panel.

5. A fastener arrangement according to claim 4, in which the frictional coefficient between the fulcrum and the receiver is such as to hold the fulcrum in place on the receiver under the force to which relative flexure of the body and the latch member gives rise.

6. A fastener arrangement according to claim 2, in which the lip is an edge of an aperture in the panel.

7. A fastener arrangement according to claim 6, in which the fastener element comprises opposed latch members engaging opposite sides of the aperture.

8. A fastener arrangement according to claim 7, in which the aperture is circular and the fastener element can be set therein at any desired orientation.

9. A fastener arrangement according to claim 7, in which the aperture is non-circular, and the fastener element can be set therein only at one or two or one of several orientations.

10. A fastener arrangement according to claim 9, in which the aperture is rectangular.

11. A fastener arrangement according to claim 9, in which the aperture is a slot.

12. A fastener arrangement according to claim 11, in which the fastener element occupies the whole of the slot.

13. A fastener arrangement according to claim 12, in which the slot is longer than the fastener element facilitating adjustment of the position of the fastener element along the slot.

14. A fastener arrangement according to claim 13, in which the slot is long enough to accommodate two or more spaced apart fastener elements.

15. A fastener arrangement according to claim 6, comprising a wedge member intermediate the opposed latch members which locks the latch members against flexure, the one relative to the other, but which is displaced by the actuator member to permit relative flexure.

16. A fastener arrangement according to claim 15, in which the wedge member comprises a wedge part joined to the actuator member by a connecting member.

17. A fastener arrangement according to claim 6, in which the body part of the fastener element has a body wedge part that is, together with the latch member, accommodated in the aperture.

18. A fastener arrangement according to claim 17 in which the latch member cooperates with the lip to flex the latch member away from the lip by having a camming face on the hook.

19. A fastener arrangement according to Claim 18, in which the latch member has camming faces on the hook operative to flex the latch member away from the lip during both engagement and release.

20. A fastener arrangement according to claim 1, in which the hook has a camming face, which may be part of a bird-mouth formation, which acts, after the actuator member is pressed for release, to propel, through the resilience of the latch member, the fastener element away from the receiver.

21. A fastener arrangement according to claim 1, in which the fulcrum comprises an arcuate formation.

22. A fastener arrangement according to claim 1, in which the fastener receiver comprises an attachment for attaching to a structural member.

23. A fastener arrangement according to claim 22, in which the body part is adapted for adhesive attachment.

24. A fastener arrangement according to claim 1, in which the fastener element is extruded and cut to required length.

\* \* \* \* \*